United States Patent [19]

Ogiwara

[11] Patent Number: 4,505,963
[45] Date of Patent: Mar. 19, 1985

[54] SEMI-METALLIC FRICTION PAD SUBJECTED TO RUST PREVENTIVE TREATMENT

[75] Inventor: Osao Ogiwara, Hanyu, Japan

[73] Assignee: Akebono Brake Industry Co., Ltd., Tokyo, Japan

[21] Appl. No.: 484,291

[22] Filed: Apr. 12, 1983

[30] Foreign Application Priority Data

Apr. 22, 1982 [JP]  Japan ................................. 57-66315

[51] Int. Cl.$^3$ .............................................. B32B 15/08
[52] U.S. Cl. ....................................... 428/74; 106/36; 428/323; 428/328; 523/149; 523/156
[58] Field of Search ................. 523/156, 149; 106/36; 188/218 L; 428/194, 289, 323, 328, 74

[56] References Cited

U.S. PATENT DOCUMENTS

| | | | |
|---|---|---|---|
| 2,369,502 | 2/1945 | Walker | 106/36 |
| 2,517,724 | 8/1950 | Schuh | 428/74 |
| 3,835,118 | 9/1974 | Rhee et al. | 523/156 X |
| 4,262,788 | 4/1981 | Yamamoto et al. | 428/328 X |
| 4,283,449 | 8/1981 | Damminger | 428/74 X |
| 4,363,884 | 12/1982 | Ogiwara | 523/156 |
| 4,369,263 | 1/1983 | Matsushima et al. | 523/156 X |
| 4,376,797 | 3/1983 | Howse | 427/410 X |
| 4,444,821 | 4/1984 | Young et al. | 428/74 X |
| 4,456,650 | 6/1984 | Melotik et al. | 428/443 X |

Primary Examiner—Henry F. Epstein
Attorney, Agent, or Firm—Armstrong, Nikaido, Marmelstein & Kubovcik

[57] ABSTRACT

A semi-metallic friction pad subjected to rust preventive treatment, sides of which are applied with a heat-proof binder solution added with rust proof metallic powder therein. The rust proof metallic powder is single or mixed powder of stainless steel, aluminum or aluminum alloy, nickel or nickel alloy and chrome or chrome alloy. The heat-proof binder solution is a heat-proof resin solution of phenol resins, epoxy resins, melamine resins or silicon resins.

3 Claims, No Drawings

SEMI-METALLIC FRICTION PAD SUBJECTED TO RUST PREVENTIVE TREATMENT

DETAILED DESCRIPTION OF THE INVENTION

The present invention relates to a semi-metallic friction pad subjected to rust preventive treatment for the purpose of preventing formation of rust cracks in the semi-metallic friction pad.

The semi-metallic friction pads comprising metallic powder of sponge iron and the like, and metallic fiber of steel wool and the like as an effective component have been known as disclosed in the specification of the U.S. Pat. No. 3,835,118 and have been recently noticed to be put to practical use since they are high in a coefficient of friction and superior in a wear resistance.

The above semi-metallic friction pads will cause troubles in the formation of rust or cracks due to rust on the occasion of the practical use since the semi-metallic friction pads comprise friction materials such as steel wool, iron powder and other materials to be easily rusted by water, salt water and the like.

Now, we may think of that a coating material is applied to sides of the semi-metallic friction pad to prevent rust cracks. In case of the conventional coating material, the coated film thereof is deteriorated by a high temperature history acted on the friction pad so as to be easily permeated therethrough with water, salt water and the like and results in forming rust at the inside of the friction pad and probably causing cracks and further disconnection of the friction pad.

The present invention aims at solving the above mentioned problems and accomplishes the purpose in such a manner that metallic powder of superior rust proofing, for example, powder of stainless steel, aluminum or aluminum alloy, nickel or nickel alloy and chrome or chrome alloy is singly or mixedly blended with a heat-proof binder solution, and thus obtained binder solution is applied to sides of the semi-metallic friction pad so as to prevent permeation of water, salt water and the like into the inside of the friction pad.

As a binder of the above heat-proof binder solution, the heat-proof resins of phenol, epoxy, melamine, silicon and the like are advantageously used. The heat-proof binder solution is blended with the foregoing rust proof metallic powder to obtain a coating material of this invention, which is applied to sides of the semi-metallic friction pad and thereafter baked at approximately 100°–200° C., thus to obtain a desirous film.

In this way, the present invention proposes to solve effectively the problems of rust cracks or defects of the semi-metallic friction pad without changing a superior coefficient of friction of the semi-metallic friction pad and advance the practical use of the semi-metallic friction pad remarkably.

The exemplary embodiment of this invention is disclosed as follows.

EXAMPLE

Sides of the semi-metallic friction pad on the market were coated with an ordinary coating material (comparative good), coated wth a stainless coat SIL-200A blended with stainless steel powder therein (name of good manufactured by Towa Industry Co., Ltd.) (No. 1 good of this invention) or coated with a cermet veil KR151 blended with mixed powder of stainless steel and aluminum therein (name of good manufactured by Nippon Science and Technology Laboratory) (No. 2 good of this invention). Then, those goods were respectively baked at 200° C. for one hour and thereafter subjected to heat deterioration in 400° C. furnace for three hours. Then, those goods were arranged to prevent permeation of the below salt water from friction surfaces being not applied with the coating material and thereafter subjected to the following rust crack test.

The comparative good and No. 1 and No. 2 goods of this invention were respectively subjected to a process of 5% salt water immersion under reduced pressure five times repeatedly and then subjected to a shelf test for 10 days. Then, the formations of rust at inside and circumference of the respective friction goods were observed. Further, after a shelf test for 60 days, the formations of cracks at circumferential portions of the goods were observed. The test result showed that the conventional good formed rust and cracks while the goods of this invention indicated no defects as represented in the below table.

TABLE

| | | Test item | | |
|---|---|---|---|---|
| | | Shelf test for 10 days | | Shelf test for 60 days |
| Good | | Circumference | Inside | Crack observation |
| Conventional good | | X | Δ | Large |
| Good of this invention | No. 1 | ⊚ | ⊚ | None |
| | No. 2 | ○ | ⊚ | None |

Note:
X Formation of rust is conspicuous.
Δ Formation of rust is fairly observed.
○ Formation of rust is very little.
⊚ Formation of rust is not observed.

Furthermore, the practical test of No. 1 and No. 2 goods of this invention resulted in confirming that those goods were sufficient to prevent salt damage in the use of halite, chloride and the like for melting snow under high load in the snowfall districts.

What is claimed is:

1. A friction pad comprising a semi-metallic friction pad having a rust-preventive coating on each side thereof, said rust-preventive coating consisting essentially of a heat-proof binder and rust-proof metallic powder.

2. A semi-metallic friction pad subjected to rust preventive treatment as defined in claim 1 wherein said rust-proof metallic powder is single or mixed powder of stainless steel, aluminum or aluminum alloy, nickel or nickel alloy, chrome or chrome alloy and the like.

3. A semi-metallic friction pad subjected to rust preventive treatment as defined in claim 1 or 2 wherein said heat-proof binder is a heat-proof resin binder of phenol resins, epoxy resins, melamine resins, silicon resins and the like.

* * * * *